United States Patent [19]
Saito et al.

[11] Patent Number: 5,710,394
[45] Date of Patent: Jan. 20, 1998

[54] TELEVISION SET SPEAKER SYSTEM

[75] Inventors: Hitoshi Saito, Ohsato-gun; Hitoshi Sango, deceased, late of Santo-gun, both of Japan, by Michiko Sango, legal representative

[73] Assignee: Kabushiki Kaisha Toshiba, Kawasaki, Japan

[21] Appl. No.: 572,668

[22] Filed: Dec. 14, 1995

Related U.S. Application Data

[63] Continuation of Ser. No. 520,517, Aug. 29, 1995, abandoned.

[30] Foreign Application Priority Data

Aug. 30, 1994 [JP] Japan .................. 6-205628

[51] Int. Cl.$^6$ .................................................. H05K 5/00
[52] U.S. Cl. .................... 181/152; 181/156; 181/141
[58] Field of Search .............................. 181/152, 156, 181/155, 141, 199; 381/188, 205

[56] References Cited

U.S. PATENT DOCUMENTS

| | | | |
|---|---|---|---|
| 4,926,487 | 5/1990 | Yoshida et al. | 381/205 |
| 5,105,905 | 4/1992 | Rice | 181/155 |
| 5,361,380 | 11/1994 | You et al. | 381/205 |
| 5,524,062 | 6/1996 | Oh | 181/156 |
| 5,604,337 | 2/1997 | Sugimoto et al. | 181/152 |

FOREIGN PATENT DOCUMENTS

| | | |
|---|---|---|
| 0 390 165 | 10/1990 | European Pat. Off. . |
| 0 462 571 | 12/1991 | European Pat. Off. . |
| 0 492 919 | 7/1992 | European Pat. Off. . |
| 0 519 509 | 12/1992 | European Pat. Off. . |
| 0 598 391 | 5/1994 | European Pat. Off. . |
| 3700539 | 7/1988 | Germany . |
| 1135295 | 5/1989 | Japan . |
| 3 94598 | 4/1991 | Japan . |

*Primary Examiner*—Khanh Dang
*Attorney, Agent, or Firm*—Cushman Darby & Cushman IP Group of Pillsbury Madison & Sutro LLP

[57] ABSTRACT

A television set speaker system includes first and second acoustic waveguides arranged respectively in the front surface parts of respective diaphragms of left channel and right channel speakers so as to radiate sounds. First and second directional reflectors are arranged respectively in the rear surface parts of the respective diaphragms of the left channel and right channel speakers so as to forcibly reflect the sound radiated from the respective rear surface diaphragms respectively in the left and right side surface part directions and to radiate the sound out of the television set through first and second radiating ports provided respectively in the left and right surface parts of the television set.

9 Claims, 6 Drawing Sheets

TELEVISION SET SPEAKER SYSTEM

This is a continuation of application Ser. No. 08/520,517 filed Aug. 29, 1995 now abandoned.

BACKGROUND OF THE INVENTION

1. Field of the Invention

This invention relates to television set speaker systems and more particularly to a television set speaker system intended to expand an audio reproducing frequency band and to reproduce a stereo audio sound accurately.

2. Description of the Related Art

Generally, in a television set, a speaker arranging place is mostly occupied by a cathode ray tube setting place and therefore the speaker is arranged on both sides or the upper or lower part of the cathode ray tube.

Recently, as the picture screen is made larger and wider, the appearance design of the television set tends to become slimmer and the form of the speaker reproducing sounds can not help becoming thinner.

However, in a speaker in which the horizontal width of the diaphragm is made smaller, it is difficult to provide low frequency sound reproduction because of the diaphragm area and the diaphragm system supporting means. Therefore, acoustic waveguides (also called speaker horns) arranged on the front surface of a speaker so as to guide sound waves being emitted from the speaker diaphragm to a sound radiating mouth have been employed as a means of slimming the television set.

However, in such television set speaker systems, it is customary to convert a sound pressure level within the acoustic waveguide and at the mouth in order to improve the performance of the sound being radiated from the mouth of the acoustic waveguide. Therefore the area of the sound radiating mouth will become smaller than the diaphragm area of the speaker to be used, the sound pressure level radiated from the mouth will decrease and the sound volume feeling and "live" feeling will be lacking in that situation.

A conventional television set speaker system is shown in FIGS. 5 and 6.

In FIG. 5, the reference numeral 10 represents a television set. Within a television set cabinet 11, left and right channel speakers 13 and 14 are arranged respectively in the left and right positions on both sides of a cathode ray tube 12. Acoustic waveguides 15 and 16 are fitted respectively to the front surface parts of the left and right channel speakers 13 and 14 and the sound radiating mouths 17 and 18 respectively of the left and right acoustic waveguides 15 and 16 are arranged near the front panel (front surface frame) of the television cabinet 11.

In the formation in FIG. 5, because no back cabinet is arranged in the rear of the speakers 13 and 14, the sound radiated from the rear diaphragm of the speaker will be radiated around from ventilating holes 19 and 20 provided around the television set cabinet 11. However, the area of each sound radiation mouth 17 and 18 is so much smaller than the diaphragm area of each speaker 13 and 14 that, when the sound pressure levels radiated from the sound radiating mouths 17 and 18 have been reduced, the sound pressure level radiated from the speaker rear surface part will be larger, and the sound radiated around from the ventilating holes 19 and 20 will mask the sound on the front side from the mouths 17 and 18. The sound quality therefore will become unclear and the left and right stereo separation will deteriorate. Such defects exist in the illustrated convention arrangement.

Therefore, when the sound quality is considered important, as in the formation in FIG. 6, back cabinets (sealed boxes) 21 and 22 typically are arranged in the rear of the left and right channel speakers 13 and 14 respectively with the acoustic waveguides 15 and 16 arranged in the front surface parts.

However, in the conventional example in FIG. 6, because the back cabinets 21 and 22 are formed in the limited space of the television set cabinet 11, the back cabinets 21 and 22 cannot be formed with a large volume. Therefore, the low frequency reproducing range will be limited disadvantageously by the volume limitation of the back cabinets 21 and 22. As a further disadvantage, the sound emitted from the rear surface parts of the speakers 13 and 14 will be enclosed by the back cabinets 21 and 22 and thus cannot be radiated out. The sound radiated out will be only from the sound radiating mouths 17 and 18 and the reproduced sound pressure level will be low.

As mentioned above, there already have been problems in that the sound radiated from the front surface of a television set is unclear and, in the system in which the back cabinets are arranged in the rear of the speakers, the back cabinets cannot be formed with a large volume. Therefore, the low frequency reproducing range is limited, the speaker rear part is sealed, and the reproduced sound pressure level is low.

SUMMARY OF THE INVENTION

An object of the present invention is to provide a television set speaker system wherein the sound radiated from the front and rear surfaces of the speaker will not interfere with each other and a sound quality high in clearness is obtained.

Another object of the present invention is to provide a television set speaker system wherein the sound reproducing range is wide and sounds high in presence feeling can be reproduced.

The television set speaker system according to the first embodiment of the invention includes a speaker arranged within the television set;

an acoustic waveguide guiding sound to the front of the television set and radiating the sound which, in turn, is from the front surface part of the diaphragm of this speaker; and a directional reflector reflecting the sound radiated from the rear surface part of the speaker diaphragm in a specific direction different from the front of the television set.

The television set speaker system according to the second embodiment of the invention includes:

a speaker arranged within the television set;

an acoustic waveguide guiding sound to the front of the television set and radiating the sound which, in turn, is radiated from the front surface part of the diaphragm of this speaker;

a directional reflector reflecting the sounds radiated from the rear surface part of the speaker diaphragm in a specific direction different from the front of the television set; and a radiating port radiating out of the television set the sounds reflected in the specific direction by this directional reflector.

In the first and second embodiments of the inventions, while the acoustic waveguide is arranged in the front surface part of the speaker diaphragm so as to radiate the sounds forward, the directional reflector is arranged in the rear surface part of the speaker diaphragm so as to forcibly reflect in the specific direction (for example, the side surface part direction) of the television set the sounds radiated from the rear surface diaphragm and to discharge the sounds out of the television set. Thereby, the sounds on the front and rear surfaces of the speaker diaphragm will not interfere with each other and will be able to be positively radiated in front of the television set and in the specific direction different from the front.

The television set speaker system according to the third embodiment of the invention includes:

a first speaker arranged within the television set;

a second speaker arranged within the television set;

a first acoustic waveguide guiding sound to the front of the television set and radiating the sound which, in turn, is radiated from the front surface part of the diaphragm of the first speaker;

a second acoustic waveguide guiding sound to the front of the television set and radiating the sound which, in turn, is radiated from the front surface part of the diaphragm of the second speaker;

a first directional reflector reflecting the sound radiated from the rear surface part of the speaker diaphragm of the first speaker in a specific direction different from the front of the television set; and a second directional reflector reflecting the sound radiated from the rear surface part of the speaker diaphragm of the second speaker in a specific direction different from the front of the television set.

The television set speaker system according to the fourth embodiment of the invention includes:

a first speaker arranged within the television set;

a second speaker arranged within the television set;

a first acoustic waveguide guiding sound to the front of the television set and radiating the sound which, in turn, is radiated from the front surface part of the diaphragm of the first speaker;

a second acoustic waveguide guiding sound to the front of the television set and radiating the sound which, in turn, is radiated from the front surface part of the diaphragm of the second speaker;

a first directional reflector reflecting the sound radiated from the rear surface part of the speaker diaphragm of the first speaker in a specific direction different from the front of the television set;

a second directional reflector reflecting the sound radiated from the rear surface part of the speaker diaphragm of the second speaker in a specific direction different from the front of the television set;

a first radiating port radiating out of the television set the sound reflected in the specific direction by the first directional reflector; and a second radiating port radiating out of the television set the sound reflected in the specific direction by the second directional reflector.

In the third and fourth embodiments of the invention, in the television set wherein a pair of the first and second speakers are arranged on the left and right, while the first and second acoustic waveguides are arranged respectively in the front surface parts of the first and second speakers, the first and second directional reflectors are provided respectively in the rear surface parts of the first and second speakers so as to forcibly reflect in the specific direction (for example, the side surface part direction) and discharge out of the television set the sound from the rear surface parts of the first and second speakers. Therefore, the sound on the front surface and rear surface of each speaker diaphragm will not interfere with each other, and the left and right waves emitted from of the respective rear surface diaphragms of the first and second speakers will interfere only slightly with each other. Further, the sounds on the speaker rear surface part reflected, for example, in the side surface part direction by the directional reflector and discharged out of the television set will reach the audience by reflecting against the peripheral wall. As a result, a sound quality high in clearness and presence feeling will be obtained.

DETAILED DESCRIPTION OF THE PREFERRED EMBODIMENTS

The embodiments shall be explained with reference to the drawings.

Figure 1:
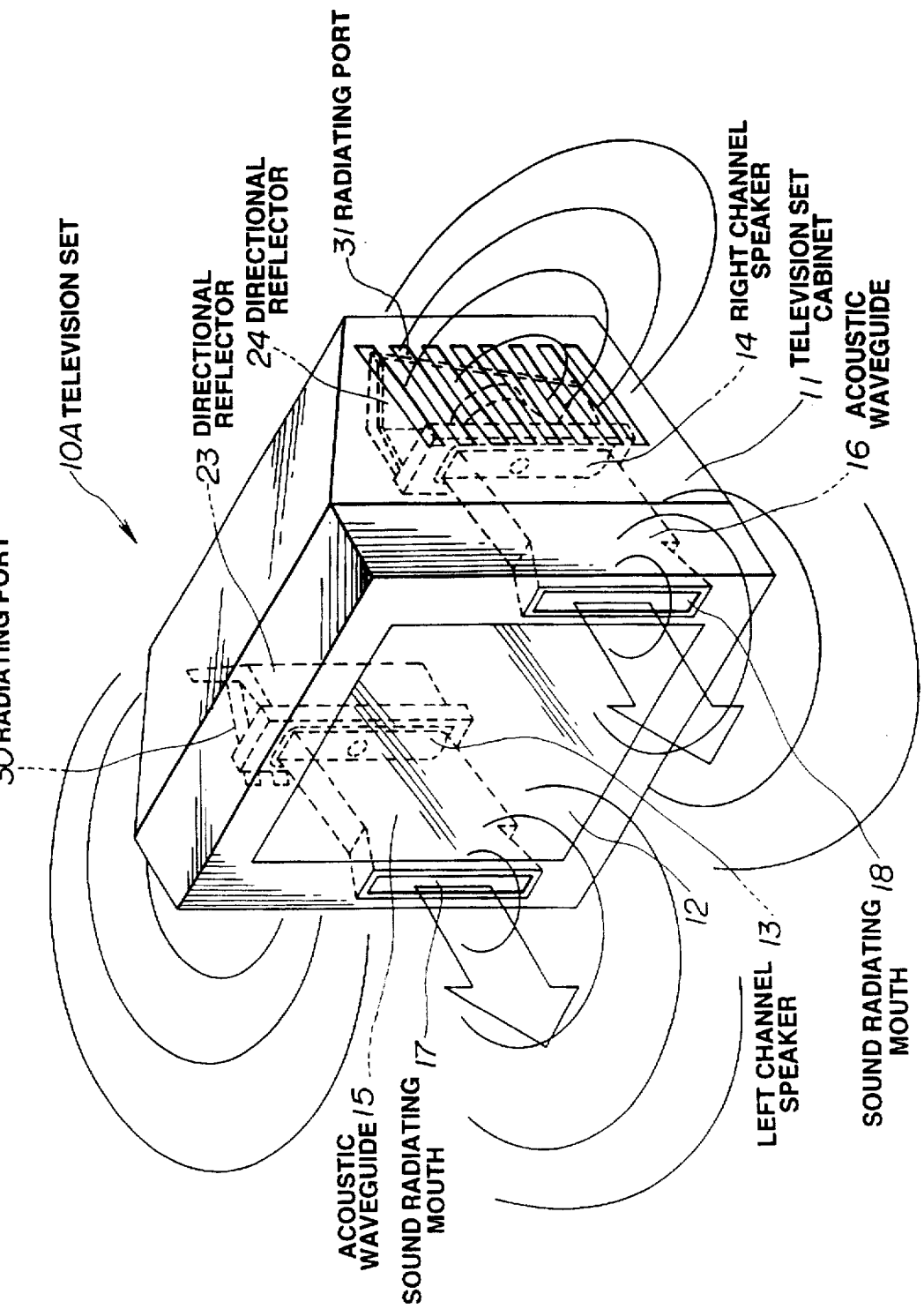
FIG. 1 is a perspective view showing a television set speaker system embodying the present invention.
Figure 2:
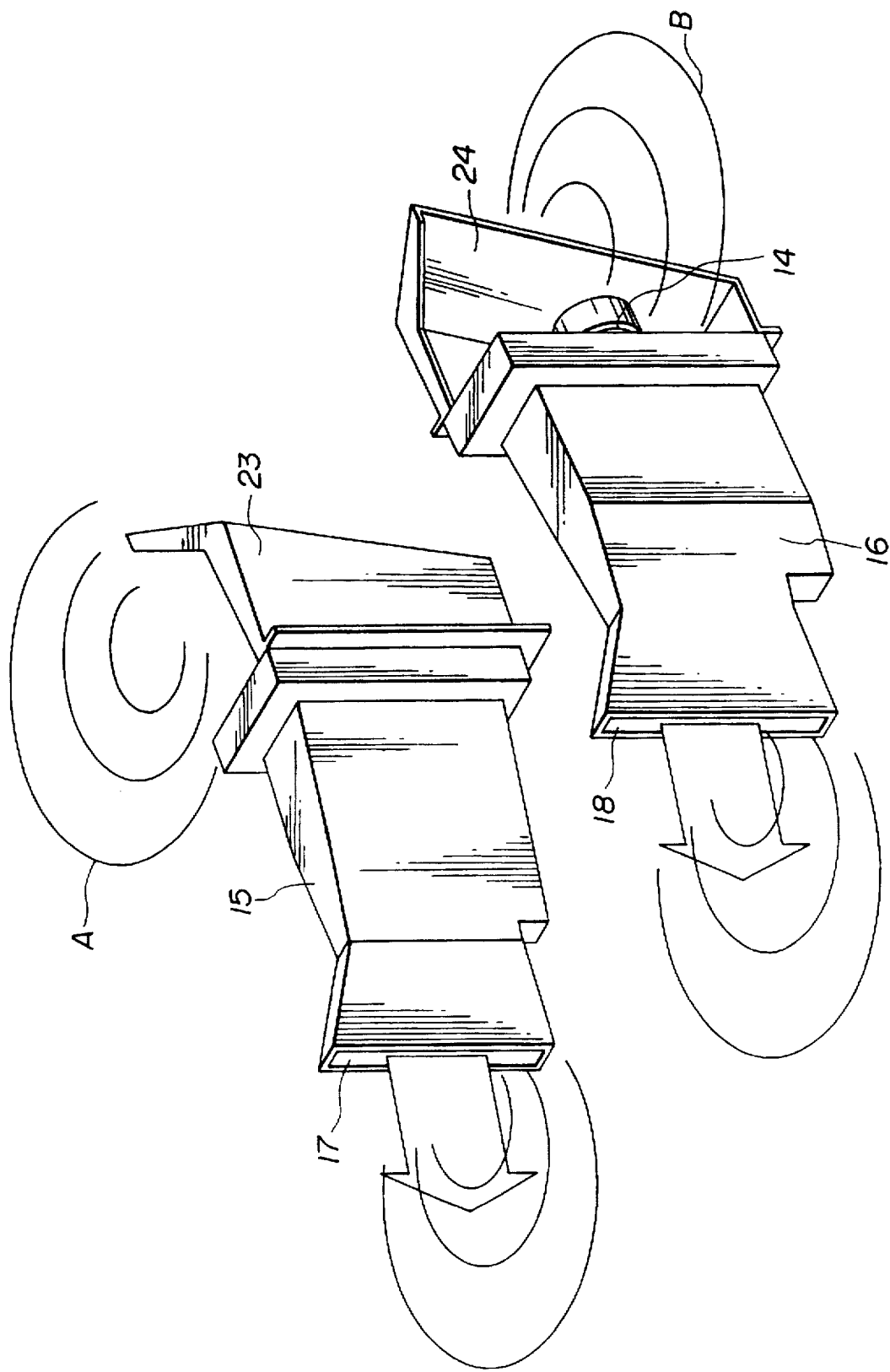
FIG. 2 is a perspective view showing a formation modeling the system in FIG. 1.
Figure 5:
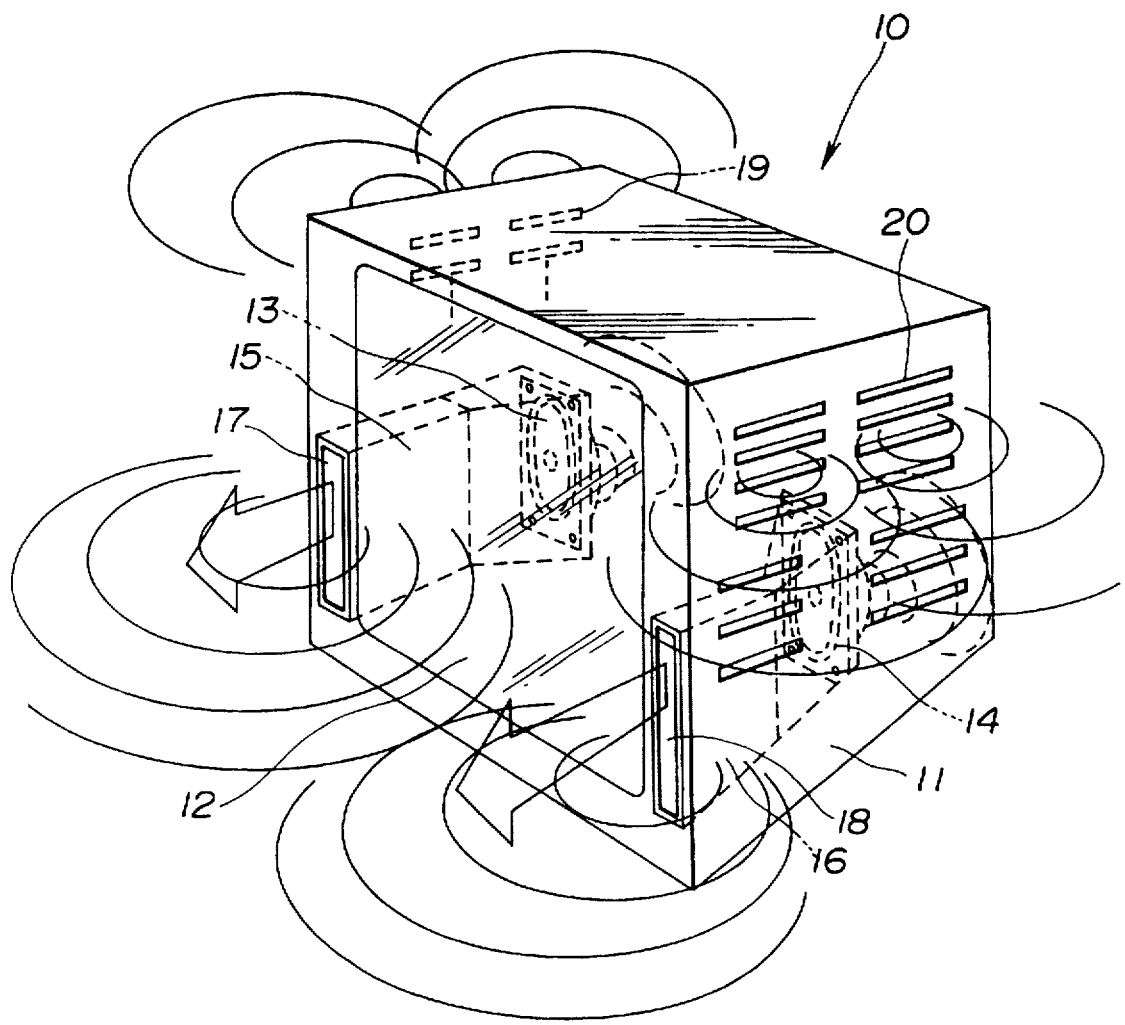
FIG. 5 is a perspective view showing a conventional television set speaker system.
Figure 6:
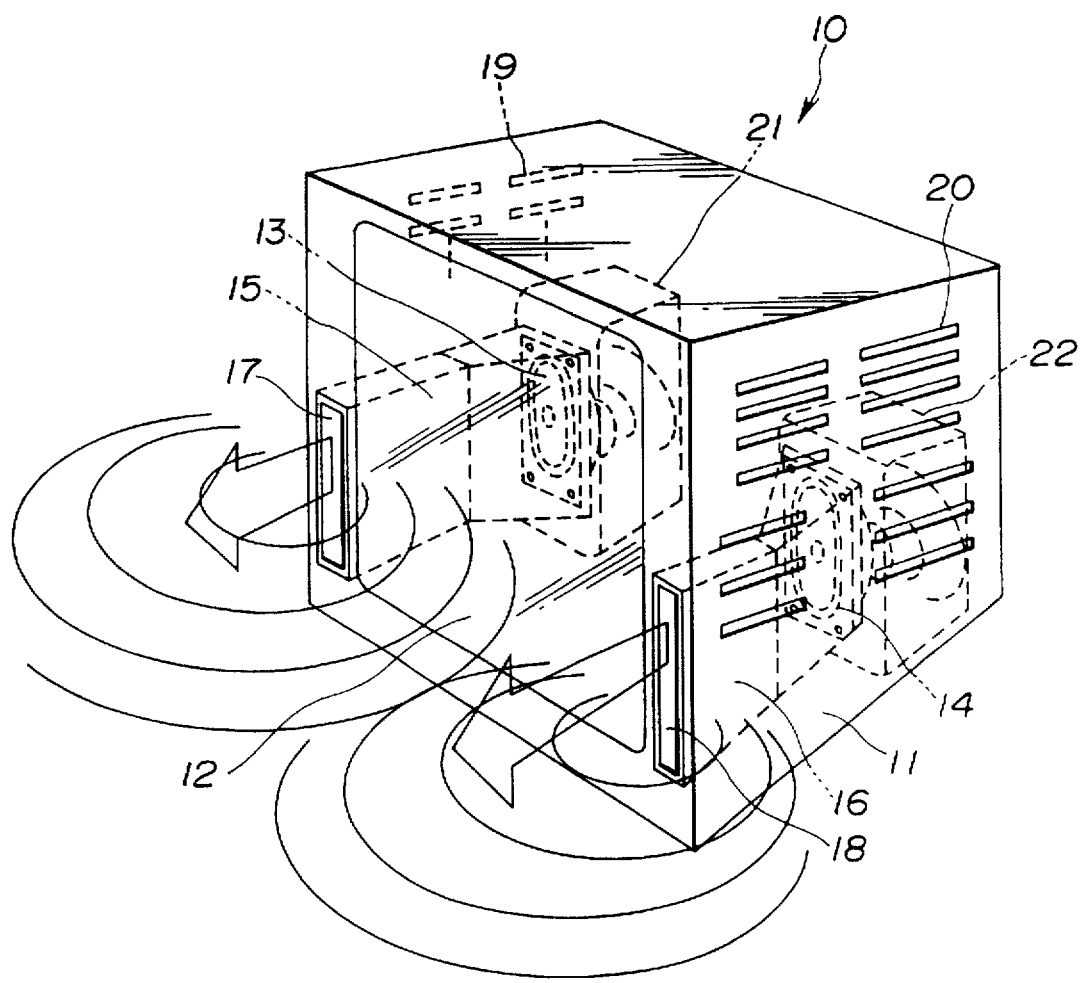
FIG. 6 is a perspective view showing a television set speaker system of another conventional example.

FIG. 1 is a perspective view showing a television set speaker system embodying the present invention. FIG. 2 is a perspective view showing the arrangement of the left and right channel speakers within the television set cabinet in FIG. 1. The same components as in the conventional example in FIG. 5 shall bear the same reference numerals in the description.

In FIG. 1, a television set 10A is provided with a cathode ray tube 12 and left and right channel speakers 13 and 14 within a television set cabinet 11. The left and right channel speakers 13 and 14 are arranged respectively in the left and right positions on both sides of the cathode ray tube 12. Acoustic waveguides 15 and 16 are arranged respectively in the front surface parts of the left and right channel speakers 13 and 14. Sound radiating mouths 17 and 18 respectively at the tips of the acoustic waveguides 15 and 16 are arranged near the front panel of the television cabinet 11. The sounds radiated from the front surface parts of the respective diaphragms of the speakers 13 and 14 are to be radiated to the front surface of the television set cabinet 11 through the acoustic waveguides 15 and 16.

Directional reflectors 23 and 24 are arranged respectively in the rear surface parts of the left and right channel speakers 13 and 14. These respective left and right directional reflectors 23 and 24 will reflect, using reflecting plates, the sound radiated from the rear surface parts of the respective diaphragms of the speakers 13 and 14. The reflecting plates are open on one side surface and upper surface (of a substantially bent cross-sectioned plane) and will discharge the sound in a specific direction (diagonally forward on the side surface part and diagonally forward on the top surface part of the cabinet in the drawing) different from that of sound emanating from the mouths at the front of the television set cabinet. The sound waves reflected by the respective left and right directional reflectors 23 and 24 are discharged out of the cabinet through the radiating ports 30 and 31 formed respectively in the left and right side surface parts of the cabinet 11. The radiating ports 30 and 31 may also serve as ventilating holes.

In such an embodiment, the sound radiated from the diaphragm front surface parts of the left and right channel speakers 13 and 14 is radiated forward of the television set 10 from the left and right sound radiating months 17 and 18 respectively through the left and right acoustic waveguides 15 and 16. At the same time, the sound radiated from the diaphragm rear surface parts of the left and right channel speakers 13 and 14 will be respectively reflected by the respective reflecting surfaces of the left and right directional reflectors 23 and 24, will be discharged diagonally forward from the side surface part and diagonally forward from the top surface part of the television set cabinet 11 and will be forcibly radiated out of the cabinet through the radiating ports 30 and 31 located in the left and right side surface parts of the television set cabinet 11. As the respective reflecting surfaces of the left and right directional reflectors 23 and 24 are directed diagonally forward and diagonally upward of the television set cabinet 11, the sound radiated from the respective diaphragm rear parts will be reflected by the reflecting surfaces of the respective directional reflectors 23 and 24 and will be discharged diagonally forward and diagonally upward. By the way, part of the sound radiated from the diaphragm rear surface parts of the speakers 13 and 14 will be reflected by the top surface part inside surface of the cabinet 11 and will be radiated out of the cabinet through the radiating ports 30 and 31. Therefore, as shown in the model of FIG. 2, the left and right sound waves A and B emitted by the respective diaphragm rear surfaces of the left and right channel speakers 13 and 14 will be of definite direction. Therefore, the left and right sound waves of the respective speaker rear surfaces will interfere only slightly with each other, the distinction between the left and right sound that is, clearness will be improved, and the stereo feeling will increase. Also, when the sound radiated from the side surface is reflected against the wall surface of the room, the expanding feeling of the sounds in the left and right directions will increase.

Figure 3:
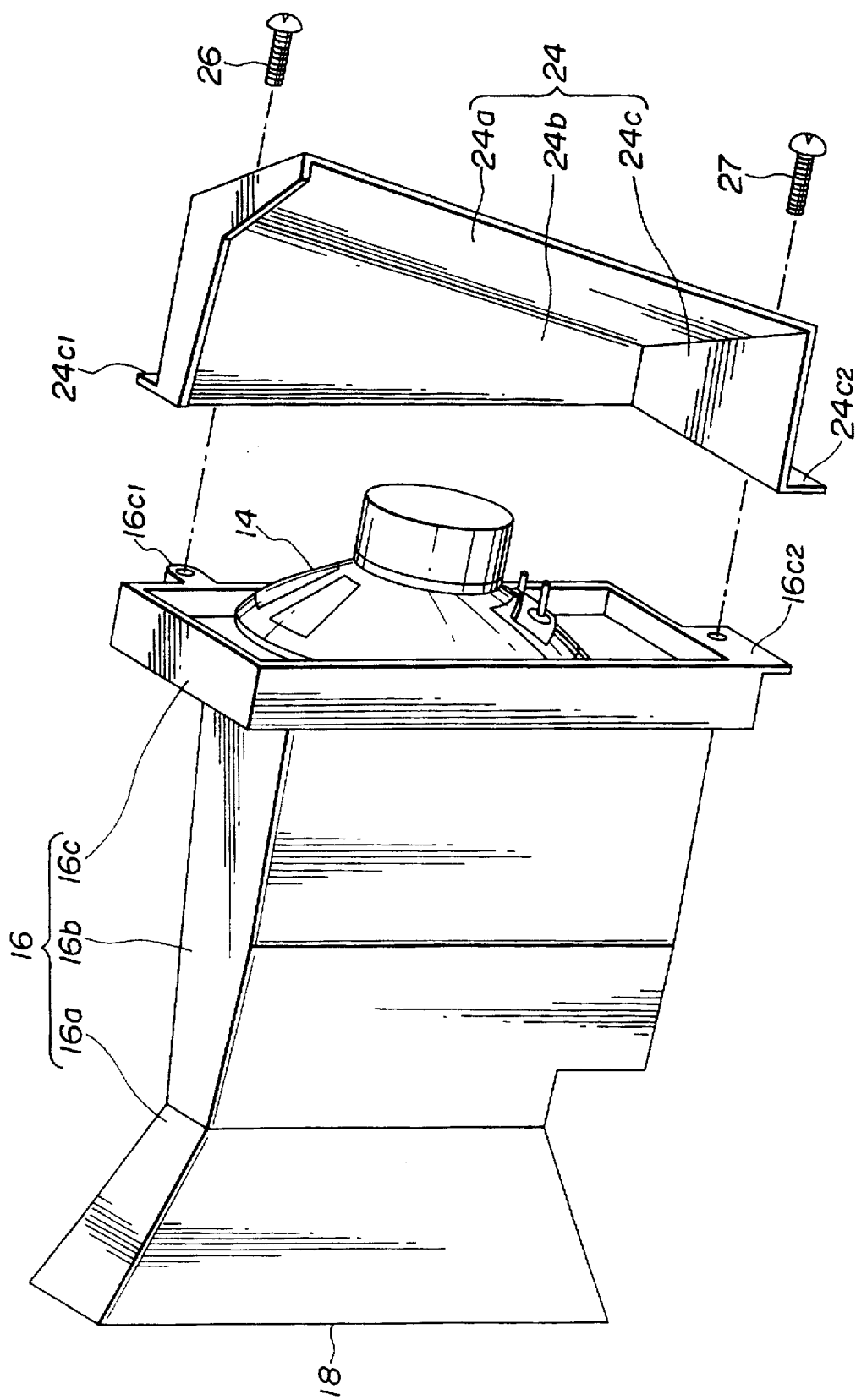
FIG. 3 is a perspective view showing one speaker system as disassembled.
Figure 4:
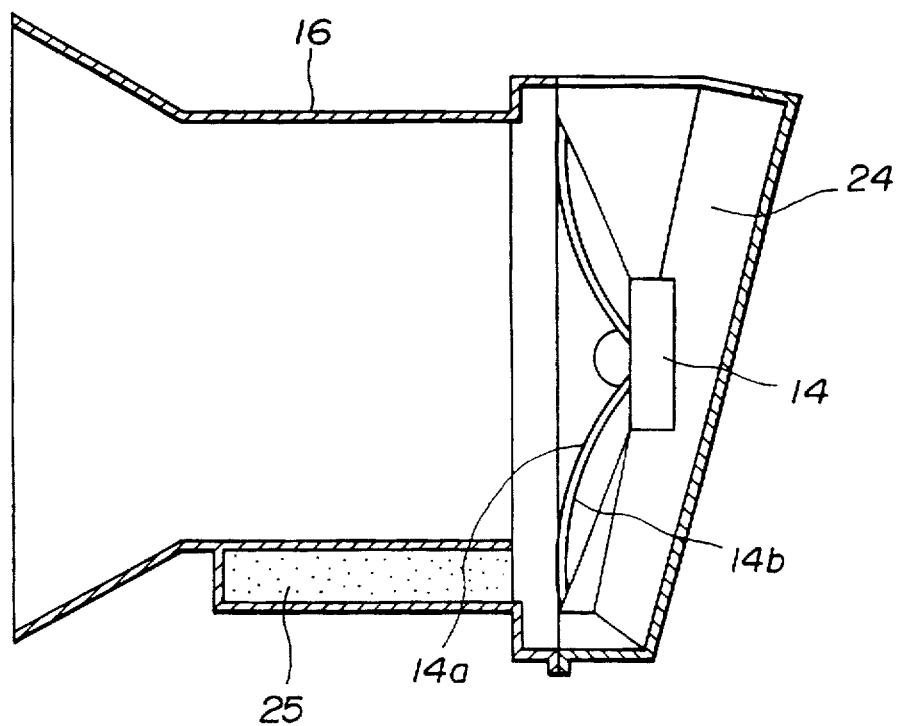
FIG. 4 is a vertically sectioned view of FIG. 3 as assembled.

FIG. 3 is a perspective view showing one speaker system (for example, the right channel speaker system) in FIG. 1 as disassembled. FIG. 4 is a vertically sectioned view of FIG. 3 as assembled.

In in the speaker system of FIG. 3, the acoustic waveguide 16 is fitted to the front surface part of the speaker 14 and the directional reflector 24 is fitted to the rear surface part of the speaker 14. The acoustic waveguide 16 is formed of a horn part 16a provided with a sound radiating mouth 18 on the tip side to radiate sound waves, a waveguide part 16b guiding sound waves to the horn side from the speaker front surface as connected to this horn part 16a and a fitting part 16c connected to the rear end of this waveguide part 16b. The front surface frame part of the speaker 14 is fixed to the fitting part 16c by such locking means as screws. Connecting parts 16c1 and 16c2 are provided as outward projections at the rear end of the fitting frame of the fitting part 16c. The connecting parts 24c1 and 24c2 of the directional reflector 24 are to be connected and fixed to the connecting parts 16c1 and 16c2 of this fitting part 16 by means of screws 26 and 27. The connecting parts 24c1 and 24c2 are flange-shaped on the outer periphery of the directional reflector 24. The directional reflector 24 is formed of a reflecting plane part 24a wherein a reflecting surface is directed diagonally forward (with respect to the front surface of the television set) and diagonally upward to reflect the sound radiated from the rear surface part of the speaker 14, a side surface shielding part 24b connected to this reflecting plane part 24a so as to shield sound waves propagating toward the center of the television set (that is, toward the cathode ray tube) and a bottom surface shielding part 24c connected to the reflecting plane part 24a so as to shield sound waves propagating toward the bottom surface of the television set.

When the directional reflector 24 is secured to the fitting part 16c of the acoustic waveguide 16 by screws 26 and 27, as shown in the vertically sectioned view in FIG. 4, the acoustic waveguide 16 will be arranged in front of the front diaphragm 14a of the speaker 14 and the directional reflector 24 will be arranged in the rear of the rear diaphragm 14b of the speaker 14. In FIG. 4, the reference numeral 25 represents a sound absorbing material to prevent resonance with a specific frequency. A cotton-like member is used for the sound absorbing material 25.

By the way, the formation of the directional reflector 24 of the right channel speaker is shown in FIGS. 3 and 4. However, the directional reflector 23 of the left channel speaker has a shape symmetrical with the directional reflector 24 but is of the same formation as of the directional reflector 24.

As described above, according to the present invention, a television speaker system which is high in clearness and which gives a presence feeling and expansion feeling can be realized without a significant increase in cost.

By the way, the present invention is not limited to only the above described embodiments and various modifications can be made in a range not deviating from the subject matter of the invention.

What is claimed is:

1. A speaker system for a television set, comprising:

a television set cabinet;

a speaker having a diaphragm, said speaker being provided within said cabinet so as to radiate sound from said diaphragm to a front of said television set;

an acoustic waveguide mounted at a front surface side of said speaker within said cabinet for guiding sound radiated from said diaphragm so as to be radiated from a front surface of said television set; and a directional reflector mounted at a rear side of said speaker within said cabinet for reflecting sound radiated from a rear surface part of said diaphragm in a direction diagonally forward from a side surface part of said television set and also diagonally forward from a top surface part of said television set.

2. A speaker system for a television set, comprising:

a television set cabinet;

a speaker having a diaphragm, said speaker being provided within said cabinet so as to radiate sound from said diaphragm to a front of said television set;

an acoustic waveguide mounted at a front surface side of said speaker within said cabinet for guiding sound radiated from said diaphragm so as to be radiated from a front surface of said television set;

a directional reflector mounted at a rear side of said speaker within said cabinet for reflecting sound radiated from a rear surface part of said diaphragm in a direction diagonally forward from a side surface part of said television set and also diagonally forward from a top surface part of said television set; and a radiating port formed in said cabinet for radiating out of said cabinet sound reflected by said directional reflector.

3. A speaker system for a television set, comprising:

a television set cabinet;

a left channel speaker having a first diaphragm, said left channel speaker being provided within said cabinet so as to radiate sound from said first diaphragm to a front surface of said television set;

a right channel speaker having a second diaphragm, said right channel speaker being provided within said cabinet so as to radiate sound from said second diaphragm to a front surface of said television set;

a first acoustic waveguide mounted at a front surface side of said left channel speaker within said cabinet for guiding sound radiated from said first diaphragm so as to be radiated from a front surface of said television set;

a second acoustic waveguide mounted at a front surface side of said right channel speaker within said cabinet for guiding sound radiated from said second diaphragm so as to be radiated from said front surface of said television set;

a first directional reflector mounted at a rear side of said left channel speaker within said cabinet for reflecting sound radiated from a rear surface part of said first diaphragm in a direction diagonally forward from a left surface part of said television set and also diagonally forward from a top surface part of said television set; and a second directional reflector mounted at a rear side of said right channel speaker within said cabinet for reflecting sound radiated from a rear surface part of said second diaphragm in a direction diagonally forward from a right surface part of said television set and also diagonally forward from a top surface part of said television set.

4. A speaker system for a television set, comprising:

a television set cabinet;

a left channel speaker having a first diaphragm, said left channel speaker being provided within said cabinet so as to radiate sound from said first diaphragm to a front surface of said television set;

a right channel speaker having a second diaphragm, said right channel speaker being provided within said cabinet so as to radiate sound from said second diaphragm to a front surface of said television set;

a first acoustic waveguide mounted at a front surface side of said left channel speaker within said cabinet for guiding sound radiated from said first diaphragm so as to be radiated from a front surface of said television set;

a second acoustic waveguide mounted at a front surface side of said right channel speaker within said cabinet for guiding sound radiated from said second diaphragm so as to be radiated from said front surface of said television set;

a first directional reflector mounted at a rear side of said left channel speaker within said cabinet for reflecting sound radiated from a rear surface part of said first diaphragm in a direction diagonally forward from a left surface part of said television set and also diagonally forward from a top surface part of said television set;

a second directional reflector mounted at a rear side of said right channel speaker within said cabinet for reflecting sound radiated from a rear surface part of said second diaphragm in a direction diagonally forward from a right surface part of said television set and also diagonally forward from a top surface part of said television set;

a first radiating port formed in said cabinet for radiating out of said cabinet sound reflected by said first directional reflector; and a second radiating port formed in said cabinet for radiating out of said cabinet sound reflected by said second directional reflector.

5. A speaker system according to claim 1, 2, 3 or 4 wherein each directional reflector includes a reflecting plane facing a respective said rear surface part so as to reflect the sound radiated from the respective said rear surface part; a side surface shielding part connected to one side of said reflecting plane so as to shield sound propagating toward said one side; a bottom surface shielding part connected to a bottom end of said reflecting plane so as to shield sound propagating toward the bottom end; a side mouth provided on a side of said reflecting plane opposite to said one side; and an upwardly open top mouth opposite to said bottom surface shielding part.

6. A speaker system for a television set, comprising:

a television set cabinet;

a speaker having a diaphragm, said speaker being provided within said cabinet so as to radiate sound from said diaphragm to a front surface of said television set;

an acoustic waveguide mounted at a front surface side of said speaker within said cabinet for guiding sound radiated from said diaphragm so as to be radiated from a front surface of said television set; and a directional reflector mounted at a rear side of said speaker within said cabinet for reflecting sound radiated from a rear surface part of said diaphragm, wherein said directional reflector includes a reflecting plane facing the rear surface part of said diaphragm so as to reflect the sound radiated from the rear surface part; a side surface shielding part connected to one side of said reflecting plane so as to shield sound propagating toward said one side; a bottom surface shielding part connected to a bottom end of said reflecting plane so as to shield sound propagating toward the bottom end; a side mouth provided on a side of said reflecting plane opposite to said one side; and an upwardly open top mouth opposite to said bottom surface shielding part.

7. The speaker system according to claim 6, and further comprising a radiating port formed in said cabinet for radiating out of said cabinet sound reflected by said directional reflector.

8. A speaker system for a television set, comprising:

a television set cabinet;

a left channel speaker having a first diaphragm, said left channel speaker being provided within said cabinet so as to radiate sound from said first diaphragm to a front surface of said television set;

a right channel speaker having a second diaphragm, said right channel speaker being provided within said cabinet so as to radiate sound from said second diaphragm to a front surface of said television set;

a first acoustic waveguide mounted at a front surface side of said left channel speaker within said cabinet for guiding sound radiated from said first diaphragm so as to be radiated from a front surface of said television set;

a second acoustic waveguide mounted at a front surface side of said right channel speaker within said cabinet for guiding sound radiated from said second diaphragm so as to be radiated from said front surface of said television set;

a first directional reflector mounted at a rear side of said left channel speaker within said cabinet for reflecting sound radiated from a rear surface part of said first diaphragm, wherein said first directional reflector includes a first reflecting plane facing the rear surface part of said first diaphragm so as to reflect the sound radiated from the rear surface part of the first diaphragm; a first side surface shielding part connected to one side of said first reflecting plane so as to shield sound propagating toward said one side of the first reflecting plane; a first bottom surface shielding part connected to a bottom end of said first reflecting plane so as to shield sound propagating toward the bottom end of the first reflecting plane; a first side mouth provided on a side of said first reflecting plane opposite to said one side of the first reflecting plane; and a first upwardly open top mouth opposite to said first bottom surface shielding part; and a second directional reflector mounted at a rear side of said right channel speaker within said cabinet for reflecting sound radiated from a rear surface part of said second diaphragm, wherein said second directional reflector includes a second reflecting plane facing the rear surface part of said second diaphragm so as to reflect the sound radiated from the rear surface part of the second diaphragm; a second side surface shielding part connected to one side of said second reflecting plane so as to shield sound propagating toward said one side of the second reflecting plane; a second bottom surface shielding part connected to a bottom end of said second reflecting plane so as to shield sound propagating toward the bottom end of the second reflecting plane; a second side mouth provided on a side of said second reflecting plane opposite to said one side of the second reflecting plane; and a second upwardly open top mouth opposite to said second bottom surface shielding part.

9. The speaker system according to claim 8, and further comprising:

a first radiating port formed in said cabinet for radiating out of said cabinet sound reflected by said first directional reflector; and a second radiating port formed in said cabinet for radiating out of said cabinet sound reflected by said second directional reflector.

* * * * *